United States Patent
Garvey et al.

(10) Patent No.: US 10,929,215 B2
(45) Date of Patent: Feb. 23, 2021

(54) API FAILURE MONITOR AND IMPACT MITIGATOR

(71) Applicant: ADP, LLC, Roseland, NJ (US)

(72) Inventors: Stephen Dale Garvey, Alpharetta, GA (US); Gregory Fincannon, Alpharetta, GA (US); Ronnie Andrews, Jr., Alpharetta, GA (US); Felipe Lisboa Suslik, Alpharetta, GA (US)

(73) Assignee: ADP, LLC, Roseland, NJ (US)

( * ) Notice: Subject to any disclaimer, the term of this patent is extended or adjusted under 35 U.S.C. 154(b) by 60 days.

(21) Appl. No.: 16/442,617

(22) Filed: Jun. 17, 2019

(65) Prior Publication Data

US 2020/0394089 A1    Dec. 17, 2020

(51) Int. Cl.
*G06F 11/00*    (2006.01)
*G06F 11/07*    (2006.01)
*G06F 9/54*    (2006.01)

(52) U.S. Cl.
CPC .............. *G06F 11/076* (2013.01); *G06F 9/54* (2013.01); *G06F 2201/835* (2013.01)

(58) Field of Classification Search
None
See application file for complete search history.

(56) References Cited

U.S. PATENT DOCUMENTS 7,565,581 B1 *    7/2009    Halligan .............    G06F 11/0727
                                                         714/51

* cited by examiner

*Primary Examiner* — Guerrier Merant
(74) *Attorney, Agent, or Firm* — Patrick J. Daugherty; Daugherty & Del Zoppo Co., LPA

(57) ABSTRACT

In response to determining that an application programming interface call made in response to a first request for the call has failed and that no fail entry has been set for the call, aspects increment a fail count value and set a fail entry for the call that includes a fail response generated by the failure of the call; in response to determining that the call has failed in response to a subsequent, second request for the call, determine whether the incremented fail count value meets a limit value, and if so, set a paused timestamp value for the fail entry; and in response to additional requests for the call occurring within a pause period of time from the paused timestamp value, pause making the call and return the fail entry set for the call in satisfaction of said additional requests.

20 Claims, 2 Drawing Sheets

API FAILURE MONITOR AND IMPACT MITIGATOR

BACKGROUND

Human resource management (sometimes "HRM" or "HR") generally refers to functions and systems deployed in organizations that are designed to facilitate or improve employee, member or participant performance in service of strategic objectives. HR comprehends how people are identified, categorized and managed within organizations via a variety of policies and systems. Human Resource management systems may span different organization departments and units with distinguished activity responsibilities. Human Resource Information Systems (HRIS) comprehend information technology (IT) systems and processes configured and utilized in the service of HR, and HR data processing systems which integrate and manage information from a variety of different applications and databases.

An Application Programming Interface (API) is a set of procedure (subroutine) definitions, communication protocols, and tools for building software, providing a set of clearly defined methods of communication among various computer programming domain components. An API specification can take many forms, including specifications for routines, data structures, object classes, variables, or remote procedure calls (RPCs), sometimes herein referred to as an "API call."

A remote procedure call enables a computer programming process to cause a subroutine to execute in a different address space, commonly on another computer, such as on a shared network in a distributed computing domain. Such a procedure may be coded as if it was a normal (local) procedure call, without requiring a programmer of other service provider to explicitly code details for the remote interaction. An API call may be referred to as a form of client-server interaction, wherein the caller is the client and the executor is a server and is typically implemented via a request-response message-passing system, a basic method used for computers to communicate with each other, in which a first computer sends a request for some data and the second responds to the request, usually in a series of such interchanges until the complete message is sent.

Request-response message exchange patterns are common deployed in client-server architectures, enabling two executing applications to engage in a two-way conversation with one another over a channel; browsing a web page is one example of request-response communication. Request-response patterns are often implemented in a synchronous fashion, which holds a connection open and waits until the response is delivered, or a timeout period expires; for example, web service calls are generally executed over a hyper-text transfer protocol (HTTP) in a synchronous fashion.

A user profile is an aggregation of permissions for a user for use across different backend systems of a data processing system. User profiles may require frequent rebuilding, such as in response to a change in services accessed by permissions, the addition of new services, or the deletion of some existing services. API calls provide effective mechanisms for efficiently rebuilding user profiles for large numbers of users (consumers) of a common service or associated with a common (generic) customer identity, such as for each of individual account holders of an on-line banking service, or for HR record management and access by individual employees or members of a large organization.

SUMMARY

In one aspect of the present invention, a method includes a processor, in response to determining that an application programming interface call made in response to a first request for the call for has failed and that no fail entry has been set for the call, incrementing a fail count value and setting a fail entry for the call, wherein the fail entry comprises a fail response generated by the failure of the first request for the call, and wherein no other fail entry is set for the call; in response to determining that the call has failed in response to a second request for the call that is subsequent to the first request, determining whether the incremented fail count value meets a limit value; in response to determining that the incremented fail count value meets the limit value, setting a paused timestamp value for the fail entry; and in response to each of any additional requests for the call occurring within a pause period of time from the paused timestamp value, pausing making the call in response to any of the additional requests and returning the fail entry set for the call in satisfaction of said any additional requests.

In another aspect, a system has a hardware processor in circuit communication with a computer-readable memory and a computer-readable storage medium having program instructions stored thereon. The processor executes the program instructions stored on the computer-readable storage medium via the computer-readable memory and thereby, in response to determining that an application programming interface call made in response to a first request for the call for has failed and that no fail entry has been set for the call, increments a fail count value and sets a fail entry for the call, wherein the fail entry comprises a fail response generated by the failure of the first request for the call, and wherein no other fail entry is set for the call; in response to determining that the call has failed in response to a second request for the call that is subsequent to the first request, determines whether the incremented fail count value meets a limit value; in response to determining that the incremented fail count value meets the limit value, sets a paused timestamp value for the fail entry; and in response to each of any additional requests for the call occurring within a pause period of time from the paused timestamp value, pauses making the call in response to any of the additional requests and returns the fail entry set for the call in satisfaction of said any additional requests.

In another aspect, a computer program product has a computer-readable storage medium with computer-readable program code embodied therewith. The computer-readable program code includes instructions for execution which cause the processor to, in response to determining that an application programming interface call made in response to a first request for the call for has failed and that no fail entry has been set for the call, increment a fail count value and set a fail entry for the call, wherein the fail entry comprises a fail response generated by the failure of the first request for the call, and wherein no other fail entry is set for the call; in response to determining that the call has failed in response to a second request for the call that is subsequent to the first request, determine whether the incremented fail count value meets a limit value; in response to determining that the incremented fail count value meets the limit value, set a paused timestamp value for the fail entry; and in response to each of any additional requests for the call occurring within a pause period of time from the paused timestamp value, pause making the call in response to any of the additional requests and return the fail entry set for the call in satisfaction of said any additional requests.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

DETAILED DESCRIPTION

API calls from one system to other systems can take longer than normal when they fail, especially if the failure causes a timeout error. Timeouts most commonly occur during attempts to connect to a remote server, or during long-lived communications, and may be caused by a variety of different connectivity problems on a network. Illustrative but not exhaustive examples include a network partition preventing the two machines from communicating, a remote machine crashing, destruction of a remote machine virtual machine (VM), a change in the firewall settings of one of machine that prevents further communication, and wrong setting values wherein a client is trying to talk to the wrong machine (for example, one that is not on the network).

Efficiencies may be achieved by making parallel API calls to rebuild large numbers of user profiles. However, this approach is only as fast and reliable as the slowest and least responsive system within the request-response communication pattern. If one system is unresponsive (the system is down, etc.), wherein it is constantly timing out, then every user profile will take the maximum time to rebuild, causing the user profile systems starts to slow down wherein requests to build new user profiles start backing up. If an API call to a particular endpoint is repeatedly failing, this can cause a significant performance impact to overall system performance that is unacceptable in a software system where high performance is a critical feature.

Aspects of the present invention provide methods, systems, processes and computer-readable storage medium solutions that prevent repeatedly-failing API calls from impacting overall system performance. Embodiments monitor API calls to one or more endpoints for repeated failures and pause failing API calls when a limit is reached, wherein the last failure response is saved when the limit is reached and used in place of making the API call during the pause period, wherein the rest of the system is not effected by the pausing.

Figure 1:
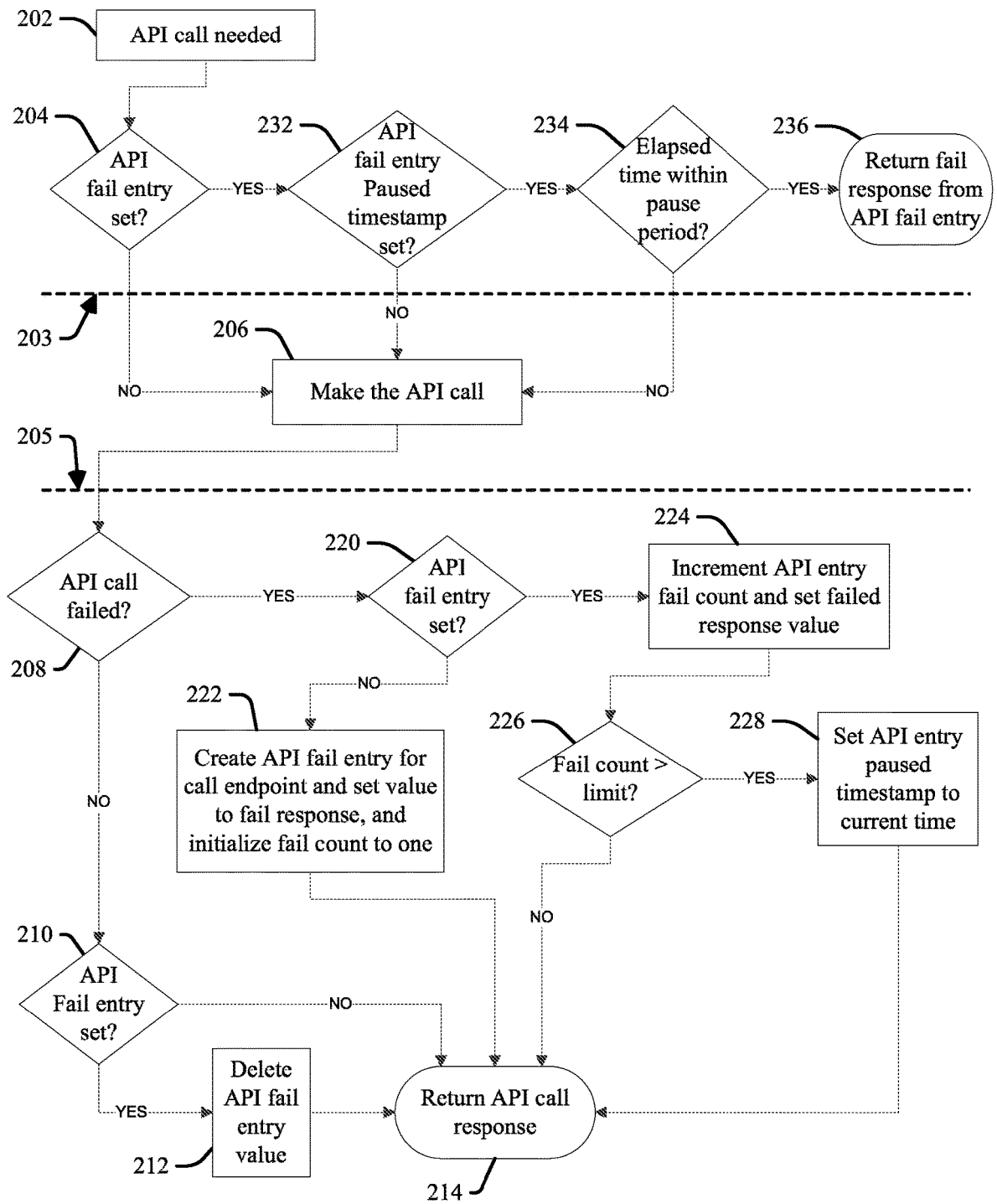
FIG. 1 is a flow chart illustration of a method or process aspect according to an embodiment of the present invention.

FIG. 1 illustrates one embodiment of the present invention that is deployed at the point of making an API call, wherein the rest of the system is not impacted by the deployment, only the code that makes the API call. The embodiment is described with respect to a pre-API logic or structure portion (depicted above a dotted demarcation line 203 relative to element 206) that includes processes 204, 232, 234 and 236, wherein said pre-API portion checks for any API failure prior to making the call at 206; and a post-API logic or structure portion, namely, the remainder of the elements of FIG. 1 that are depicted below another dotted demarcation line 205, relative to element 206, wherein the post-API portion monitors made calls for failure, and counts repeated failures and responsively initiates a pause period as a function of the failure count meeting a threshold or limit.

Thus, in the pre-API portion 203 of the embodiment, in response to an initial (first) request to make a specific API call at 202 (for example, a call to a specific remote server for a specific data value stored thereon), at 204 a processor configured according to the present invention (the "configured processor") checks to see if there have been any historic API call timeouts or other failures with respect to this call; if not (condition "No"), then the configured processor moves to the post-API portion 205 and makes the API call at 206, and determines at 208 whether the call made at 206 failed (timed out, etc.). In response to determining at 208 that the call did not fail (condition "No"), at 210 the configured processor determines whether any API fail entry exists for this specific call (thus, if an entry is saved to a memory device and associated to the call as a timeout or other failure response to the call): if so (condition "Yes"), then at 212 the configured processor deletes the fail entry (which effectively resets fail counting procedures discussed below) and at 214 returns the response to the API call.

Returning again to 202 for a second, subsequent iteration or request for the same, specific API call, at 204 the configured processor again checks to see if there have been any historic failures for this API call; as the answer is still no in the present example (condition "No"), the configured processor again moves to the post-API portion 205 and makes the second-requested API call at 206, and determines at 208 whether the second iteration of the call at 206 failed.

In response to determining at 208 that this second call iteration did fail (condition "Yes"), at 220 the configured processor determines whether any API fail entry exists for the call: as it does not, since it has been deleted at 212, (condition "No"), the configured processor moves to 222. At 222 the configured processor initializes a fail count field or value for the call to a value of one (1), representing the first counted instance of failure for this API call; and creates an API fail entry for the call endpoint, and sets the value of the created fail entry to the fail response generated by the failure of the call that comprises data descriptive of the failed call: for example, identifying the endpoint that the system was trying (unsuccessfully) to call, and the value the response received (a timeout or other failure message), and still other appropriate information will be apparent to one skilled in the art. In one example the created fail entry is set to a string data entry at 222 having a "TIMED OUT" value. It is further noted that the configured processor does not set a paused timestamp value at 222, wherein this aspect is discussed below.

Thus, in another subsequent, third request or need for the API call as determined at 202, at 204 the configured processor again checks to see if there have been any historic failures saved for this API call; as the answer is now yes (condition "Yes"), due to the fail entry created at 222 above, the configured processor remains within the pre-API structure portion 203 and at 232 determines whether a fail entry paused timestamp value has been set (which is set in response to hitting a failure count limit value, as discussed below); as the fail entry paused timestamp value has not yet been set (condition "No"), the configured processor moves on to the post-API structure 205 and executes the call for the third time at 206. Thus, in the event that call also fails at 208, for this call and each subsequent iteration of this specific call, in response to finding the existing fail entry at 220 (condition "Yes") at 224 the configured processor increments the fail count value for the call and creates and saves a fail entry comprising data descriptive of the failed call, without setting the paused timestamp value; and then at 226 determines whether the incremented fail count meets a specified or determined fail count threshold. In one example the fail count threshold is ten (10), though this is not a limiting example and one skilled in the art will appreciated that other values may be practiced in implementation of the embodiment.

In response to determining at 226 that the incremented fail count does not meet the fail count threshold (condition "No"), the configured processor moves on to return the API response (the failure) at 214. Otherwise, in response to determining at 226 that the incremented fail count meets the fail count threshold (condition "Yes") (in the present example, after ten iterations of making the call at 206 result in ten failure determinations and a total of ten corresponding fail count incrementations at 222 and 224), at 228 the configured processor sets the API entry "paused" timestamp value to the current time, and then moves on to return the API response (the failure) at 214.

Thus, in response to a next subsequent determination that the specific call is needed at 202, at 204 the configured processor checks to see if there have been any historic failures saved for this API call, wherein the answer is yes (condition "Yes"), due to the fail entry created at 224, and accordingly the configured processor remains within the pre-API structure portion and at 232 determines whether a fail entry paused timestamp value has been set. In response to determining at 232 that the fail entry paused timestamp value has been set (condition "Yes"), as accomplished at 228, at 234 the configured processor determines whether an elapsed time since the fail entry paused timestamp value is within (less than) a specified or determined pause period duration. In the present example the pause period is thirty (30) seconds, though this is not a limiting example and one skilled in the art will appreciated that other values may be practiced in implementation of the embodiment.

During this pause period, the embodiment pauses from making the same API call. More particularly, in response to determining at 234 that elapsed time is within the pause period duration (condition "Yes"), at 236 the configured processor returns the failure response saved to the API entry (at the most recent iteration of 224). This occurs for each subsequent iteration of requests for the call at 202 until the pause period elapses (condition "No" at 234), wherein the configured processor responsively moves on to the post-API structure and makes the call at 206: if this call fails (condition "Yes" at 208), as a fail entry exists (condition "Yes" at 220), after incrementing the count again and setting the failed response to the API entry (at 224), as the fail count still exceeds the threshold limit (condition "Yes" at 226), at 228 the configured processor resets the API entry "paused" timestamp value to the current time and moves on to return the API response (the failure) at 214, wherein the pause period has been restarted: thus, the API call is again paused for the pause time period as described above, returning the saved fail response at 236 that was set at the last iteration of 224, until lapse of the time period.

Thus, once a call fails a specified or determined failure limit threshold (for example 10) times in a row, the configured processor pauses making any additional calls to the failing destination for the pause period (for example, 30 seconds), and instead (quickly, immediately) returns the response the last time that this call failed. Since the process is not being called during this pause period, the process is not timing out, preventing the negative impact (degradation) on the overall system performance that would otherwise be caused by each call timing out. Once a successful call is finally made (condition "No" at 208), then the fail entry is deleted (at 212, in response to a condition "Yes" at 210), resetting the process, and the result of the successful call is returned at 214, and the call is made going forward at each request or need determination at 202, until a failure again occurs, starting counting of each failure and implementation of another pause period if the conditions defined by the FIG. 1 embodiment described above are again met.

The pause period and failure limit may be set or revised dynamically, definable by API endpoint or set statically or adjusted dynamically at run time, namely in response to statistical data generated from executing processes associated to the call. For example, the configured processor may increase the pause period and/or reduce the failure limit used to trigger onset of the pause period in response to determining that current system performance is not meeting a performance benchmark, thereby correspondingly increasing the frequency of usage of the pause period and preventing delays caused by failures returned from the API call.

Thus, embodiments of the present invention provide advantages is rebuilding profiles and performing other API call processing: even if one system fails to respond to a given API call, the resulting timeout or other failure will not degrade overall system performance while the failing API is paused, increasing system performance relative to conventional processes.

Further, via deployment right at the point where an API call is made, the system incorporating the configured processor is not negatively impacted by the process of FIG. 1: the embodiment doesn't impact anything other than the code that makes the API call, causing no demands or interference with the execution of other processes within the system.

Figure 2:
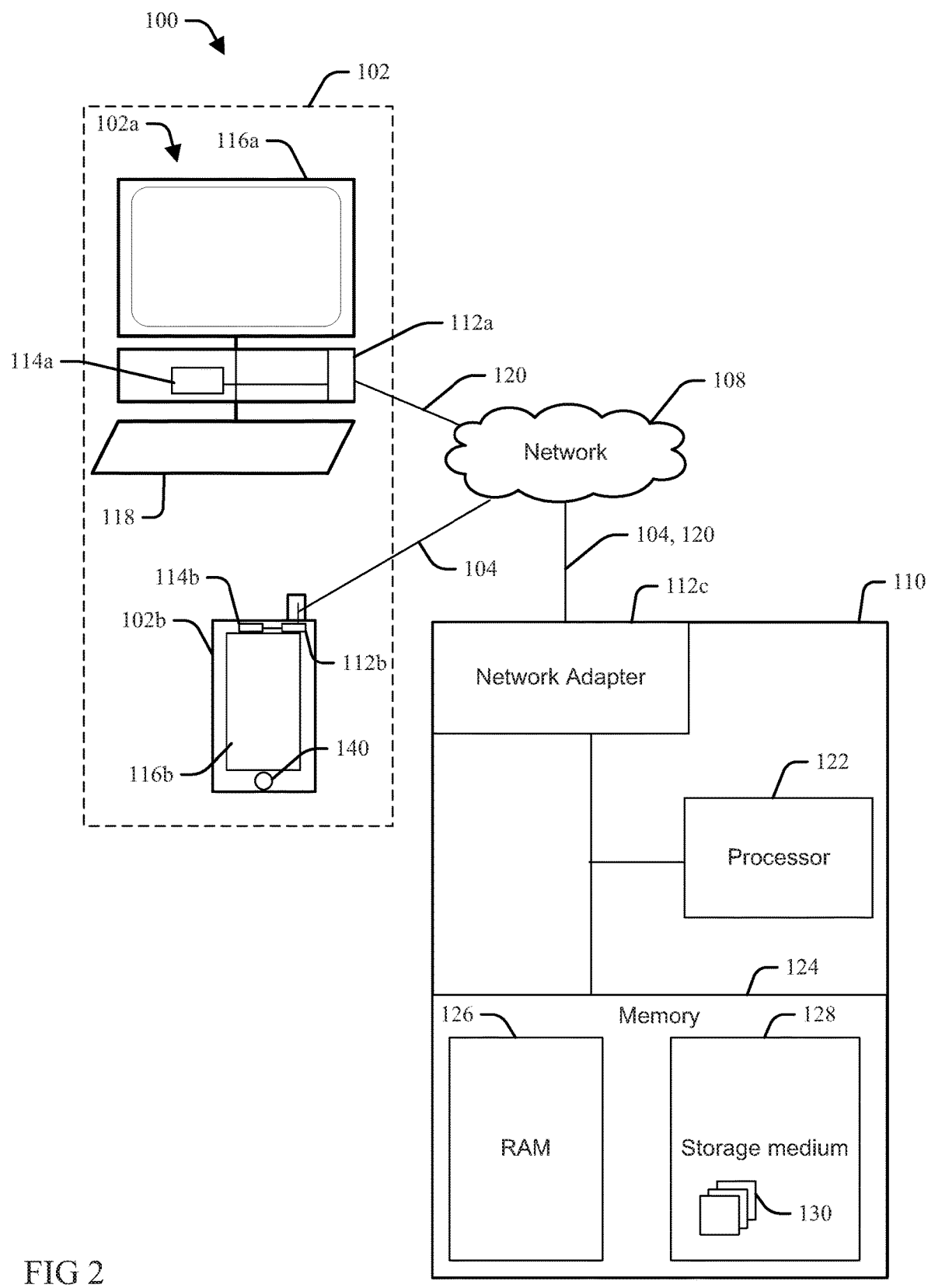
FIG. 2 is a graphic illustration of an example of an implementation according to an embodiment of the present invention.

FIG. 2 is a schematic, graphic illustration of an embodiment of a system 100 according to the present invention. The system 100 includes one or more local computing devices 102, such as, for example, a desktop computer 102a or smartphone 102b; other examples includes a laptop computer, personal digital assistant, tablet, cellular telephone, body worn device, or the like. Lines of the schematic illustrate communication paths between the devices 102a, 102b and a computer server 110 over a network 108, and between respective components within each device. Communication paths between the local computing devices 102a and 102b and the computer server 110 over the network 108 include respective network interface devices 112a, 112b, and 112c within each device, such as a network adapter, network interface card, wireless network adapter, and the like.

In one example the smartphone 102b routes data 104 including an incoming API call request (at 202, FIG. 1) such as in response to an input through a GUI display device 116b or to verbal command received via a microphone 140, over a network 108 to a computer server 110 via their respective network interface adapters 112b and 112c. The computer server 110 includes a processor 122 configured with instructions stored in a memory 124 (thus, the "configured processor" discussed above with respect to FIG. 1). The processor 122 of the computer server 110 and the processors 114a and 114b of the local computing devices include, for example, a digital processor, an electrical processor, an optical processor, a microprocessor, a single core processor, a multi-core processor, distributed processors, parallel processors, clustered processors, combinations thereof and the like. The memory 124 includes a computer-readable random access memory (RAM) 126 and a computer-readable storage medium 128.

The processor 122 thus performs or executes the processes described above with respect to FIG. 1, communicating resultant data output 120 (a result returned from the API call, or the fail response saved to the API entry at 236) from its network interface adapter 112*c* to the other local computing devices 102*a* and 102*b* via their respective network interface adapters 112*a* and 112*b*.

The local computing devices 102*a* and 102*b* include one or more input devices 118, such as a keyboard, mouse, microphone, touch screen, etc., and wherein the processor 114*a* drives display devices 116*a* to present data values, including results returned for the API call as described above with respect to FIG. 1. The computer-readable storage medium 128 can be a tangible device that retains and stores instructions for use by an instruction execution device, such as the processor 122. The computer-readable storage medium 128 may be, for example, but is not limited to, an electronic storage device, a magnetic storage device, an optical storage device, an electromagnetic storage device, a semiconductor storage device, or any suitable combination of the foregoing.

A computer-readable storage medium 128 includes the shared cache 205 described above and as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be transmitted to respective computing/processing devices from the computer-readable storage medium 128 or to an external computer or external storage device via the network 108. The network 108 can include private networks, public networks, wired networks, wireless networks, data networks, cellular networks, local area networks, wide area networks, the Internet, and combinations thereof. The network interface devices 112*a*, 112*b* and 122*c* in each device exchange (receive and send) computer-readable program instructions from and through the network 108 and, include storage in or retrieval from the computer-readable storage medium 128.

Computer-readable program instructions for carrying out operations of the present invention may include assembler instructions, instruction-set-architecture (ISA) instructions, machine instructions, machine dependent instructions, microcode, firmware instructions, state-setting data, configuration data for integrated circuitry, compiled or interpreted instructions, source code or object code written in any combination of one or more programming languages or programming environments, such as Java®, Javascript®, C, C#, C++, Python, Cython, F#, PHP, HTML, Ruby, and the like. (JAVA and JAVASCRIPT are trademarks of Oracle America, Inc., in the United States or other countries.)

The computer-readable program instructions may execute entirely on the computer server 110, partly on the computer server 110, as a stand-alone software package, partly on the computer server 110 and partly on the local computing devices 102 or entirely on the local computing devices 102. For example, the local computing devices 102 can include a web browser that executes HTML instructions transmitted from the computer server 110, and the computer server executes JAVA instructions that construct the HTML instructions. In another example, the local computing devices 102 include a smartphone application, which includes computer-readable program instructions to perform the processes described above.

The memory 124 can include a variety of computer system readable media. Such media may be any available media that is accessible by computer server 110, and the media includes volatile media, non-volatile media, removable, non-removable media, and combinations thereof. Examples of the volatile media can include random access memory (RAM) and/or cache memory. Examples of non-volatile memory include magnetic disk storage, optical storage, solid state storage, and the like. As will be further depicted and described below, the memory 124 can include at least one program product having a set (e.g., at least one) of program modules 130 that are configured to carry out the functions of embodiments of the invention.

The computer system 100 is operational with numerous other computing system environments or configurations. Examples of well-known computing systems, environments, and/or configurations that may be suitable for use with computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine ("a configured processor"), such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one aspect, a service provider may perform process steps of the invention on a subscription, advertising, and/or fee basis. That is, a service provider could offer to integrate computer-readable program code into the computer system 100 to enable the computer system 100 to perform the processes of FIG. 1 discussed above. The service provider can create, maintain, and support, etc., a computer infrastructure, such as components of the computer system 100, to perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 110, from a tangible computer-readable medium device 128; (2) adding one or more computing devices to the computer infrastructure 100; and (3) incorporating and/or modifying one or more existing systems 110 of the computer infrastructure 100 to enable the computer infrastructure 100 to perform process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply any precedence, ordering or ranking of any claim elements, limitations or process steps.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
in response to determining that an application programming interface call made in response to a first request for the call has failed and that no fail entry has been set for the call, incrementing a fail count value and setting a fail entry for the call, wherein the fail entry comprises a fail response generated by the failure of the first request for the call, and wherein no other fail entry is set for the call;
in response to determining that the call has failed in response to a second request for the call, wherein the second request is subsequent to the first request, determining whether the incremented fail count value meets a limit value;
in response to determining that the incremented fail count value meets the limit value, setting a paused timestamp value for the fail entry; and
in response to each of any additional requests for the call occurring within a pause period of time from the paused timestamp value, pausing making the call in response to any of the additional requests and returning the fail entry set for the call in satisfaction of said any additional requests.

2. The method of claim 1, further comprising:
making the call in response to determining that a time of a third request for the call is after an end of the pause period of time;
in response to determining that the call made in response to the third request has failed, revising the paused timestamp value set for the fail entry to a time of failure of the call made in response to the third request; and
pausing making the call in response to any other requests for the call and returning the fail entry set for the call in satisfaction of said other requests for the call within the pause period of time from the revised paused timestamp value.

3. The method of claim 2, further comprising:
in response to determining that making the call in response to the third request for the call has not failed, deleting the fail entry and returning the response received for the call made in response to the third request; and
making the call in response to a fourth request for the call that is subsequent to the third request in response to determining that no fail entry is set for the call.

4. The method of claim 3, wherein each returning of the fail entry set for the call in satisfaction for each of the any additional requests for making the call within the pause period of time is executed within an elapsed time that is less than a time required to determine that the call has failed by timing out.

5. The method of claim 4, further comprising:
defining at least one of the pause period of time and the failure limit by an application programming interface endpoint.

6. The method of claim 4, further comprising:
dynamically adjusting at run time at least one of the pause period of time and the failure limit in response to statistical data generated from executing processes associated to the call.

7. The method of claim 1, further comprising:
integrating computer-readable program code into a computer system comprising a processor, a computer-readable memory in circuit communication with the processor, and a computer-readable storage medium in circuit communication with the processor; and wherein the processor executes program code instructions stored on the computer-readable storage medium via the computer-readable memory and thereby performs the incrementing the fail count value and setting the fail entry for the call in response to determining that the call made in response to the first request has failed and that no fail entry has been set for the call, the determining whether the incremented fail count value meets a limit value, the setting the paused timestamp value for the fail entry in response to determining that the incremented fail count value meets the limit value, and the pausing making the call in response to any additional requests for the call and the returning the fail entry set for the call in satisfaction of said additional requests for the call in response to each of the any additional requests occurring within the pause period of time from the paused timestamp value.

8. The method of claim 7, wherein the computer-readable program code is provided as a service in a cloud environment.

9. A system, comprising:
a processor;
a computer-readable memory in circuit communication with the processor;
a computer-readable storage medium in circuit communication with the processor; and
wherein the processor executes program instructions stored on the computer-readable storage medium via the computer-readable memory and thereby:
in response to determining that an application programming interface call made in response to a first request for the call has failed and that no fail entry has been set for the call, increments a fail count value and sets a fail entry for the call, wherein the fail entry comprises a fail response generated by the failure of the first request for the call, and wherein no other fail entry is set for the call;
in response to determining that the call has failed in response to a second request for the call, wherein the second request is subsequent to the first request, determines whether the incremented fail count value meets a limit value;
in response to determining that the incremented fail count value meets the limit value, sets a paused timestamp value for the fail entry; and
in response to each of any additional requests for the call occurring within a pause period of time from the paused timestamp value, pauses making the call in response to any of the additional requests and returns the fail entry set for the call in satisfaction of said any additional requests.

10. The system of claim 9, wherein the processor executes the program instructions stored on the computer-readable storage medium via the computer-readable memory and thereby:
makes the call in response to determining that a time of a third request for the call is after an end of the pause period of time;
in response to determining that the call made in response to the third request has failed, revises the paused timestamp value set for the fail entry to a time of failure of the call made in response to the third request; and
pauses making the call in response to any other requests for the call and returns the fail entry set for the call in satisfaction of said other requests for the call within the pause period of time from the revised paused timestamp value.

11. The system of claim 10, wherein the processor executes the program instructions stored on the computer-readable storage medium via the computer-readable memory and thereby:
in response to determining that making the call in response to the third request for the call has not failed, deletes the fail entry and returns the response received for the call made in response to the third request; and
makes the call in response to a fourth request for the call that is subsequent to the third request in response to determining that no fail entry is set for the call.

12. The system of claim 11, wherein the processor executes the program instructions stored on the computer-readable storage medium via the computer-readable memory and thereby returns the fail entry set for the call in satisfaction for each of the any additional requests for making the call within the pause period of time within an elapsed time that is less than a time required to determine that the call has failed by timing out.

13. The system of claim 12, wherein the processor executes the program instructions stored on the computer-readable storage medium via the computer-readable memory and thereby:
defines at least one of the pause period of time and the failure limit by an application programming interface endpoint.

14. The system of claim 12, wherein the processor executes the program instructions stored on the computer-readable storage medium via the computer-readable memory and thereby:
dynamically adjusts at run time at least one of the pause period of time and the failure limit in response to statistical data generated from executing processes associated to the call.

15. A computer program product, comprising:
a computer-readable storage medium having computer-readable program code embodied therewith, wherein the computer-readable storage medium is not a transitory signal per se, the computer-readable program code comprising instructions for execution by a processor that cause the processor to:
in response to determining that an application programming interface call made in response to a first request for the call has failed and that no fail entry has been set for the call, increment a fail count value and set a fail entry for the call, wherein the fail entry comprises a fail response generated by the failure of the first request for the call, and wherein no other fail entry is set for the call;
in response to determining that the call has failed in response to a second request for the call, wherein the second request is subsequent to the first request, determine whether the incremented fail count value meets a limit value;
in response to determining that the incremented fail count value meets the limit value, set a paused timestamp value for the fail entry; and
in response to each of any additional requests for the call occurring within a pause period of time from the paused timestamp value, pause making the call in response to any of the additional requests and return the fail entry set for the call in satisfaction of said any additional requests.

16. The computer program product of claim 15, wherein the computer-readable program code instructions for execution by the processor further cause the processor to:

make the call in response to determining that a time of a third request for the call is after an end of the pause period of time;

in response to determining that the call made in response to the third request has failed, revise the paused timestamp value set for the fail entry to a time of failure of the call made in response to the third request; and pause making the call in response to any other requests for the call and return the fail entry set for the call in satisfaction of said other requests for the call within the pause period of time from the revised paused timestamp value.

17. The computer program product of claim 16, wherein the computer-readable program code instructions for execution by the processor further cause the processor to:

in response to determining that making the call in response to the third request for the call has not failed, delete the fail entry and return the response received for the call made in response to the third request; and make the call in response to a fourth request for the call that is subsequent to the third request in response to determining that no fail entry is set for the call.

18. The computer program product of claim 17, wherein the computer-readable program code instructions for execution by the processor further cause the processor to return the fail entry set for the call in satisfaction for each of the any additional requests for making the call within the pause period of time within an elapsed time that is less than a time required to determine that the call has failed by timing out.

19. The computer program product of claim 18, wherein the computer-readable program code instructions for execution by the processor further cause the processor to:

define at least one of the pause period of time and the failure limit by an application programming interface endpoint.

20. The computer program product of claim 18, wherein the computer-readable program code instructions for execution by the processor further cause the processor to:

dynamically adjust at run time at least one of the pause period of time and the failure limit in response to statistical data generated from executing processes associated to the call.

\* \* \* \* \*